United States Patent [19]

Monahan et al.

[11] Patent Number: 5,598,913
[45] Date of Patent: Feb. 4, 1997

[54] ONE-WAY OVER-RUNNING CLUTCH PULLEY

[75] Inventors: Russell E. Monahan, Ann Arbor; Scott A. Wojan, Novi; Jonathan M. Adler, Ypsilanti; Noboru Kashino, Ann Arbor, all of Mich.

[73] Assignee: NTN Corporation, Osaka, Japan

[21] Appl. No.: 476,219

[22] Filed: Jun. 7, 1995

[51] Int. Cl.⁶ .................................................. F16D 13/12
[52] U.S. Cl. ..................... 192/41 S; 192/81 C; 192/84.8
[58] Field of Search ................................ 192/41 S, 81 C, 192/84 T

[56] References Cited

U.S. PATENT DOCUMENTS

| | | |
|---|---|---|
| 2,230,293 | 2/1941 | Harris . |
| 2,794,524 | 6/1957 | Sacchini et al. ...................... 192/41 S |
| 2,829,748 | 4/1958 | Sacchini et al. ...................... 192/41 S |
| 2,866,349 | 12/1958 | Heckenthorn . |
| 2,885,896 | 5/1959 | Hungerford, Jr. et al. . |
| 2,886,977 | 5/1959 | Ausdall . |
| 2,911,961 | 11/1959 | McRae . |
| 2,911,962 | 11/1959 | McRae . |
| 2,945,482 | 7/1960 | McRae . |
| 2,964,959 | 12/1960 | Beck et al. . |
| 3,012,445 | 12/1961 | Becker et al. . |
| 3,019,871 | 2/1962 | Sauzedde ............................ 192/81 C |
| 3,048,056 | 8/1962 | Wolfram . |
| 3,618,730 | 11/1971 | Mould, III . |
| 3,759,111 | 9/1973 | Hoff . |
| 3,884,089 | 5/1975 | Avramidis . |
| 3,965,768 | 6/1976 | Foster . |
| 4,031,761 | 6/1977 | Fisher et al. . |
| 4,460,076 | 7/1984 | Yamada ............................ 192/81 C X |
| 4,466,522 | 8/1984 | Shibuya ............................ 192/41 S X |
| 4,473,362 | 9/1984 | Thomey et al. . |
| 4,725,259 | 2/1988 | Miyata . |
| 4,830,151 | 5/1989 | Numata ............................ 192/41 S X |
| 4,913,274 | 4/1990 | Nishimura ....................... 192/41 S X |
| 5,139,463 | 8/1992 | Bytzek et al. . |
| 5,156,573 | 10/1992 | Bytzek et al. . |
| 5,273,229 | 12/1993 | Komatsu .......................... 192/41 S X |
| 5,314,053 | 5/1994 | Nishimura ........................ 192/81 C X |

Primary Examiner—Andrea L. Pitts
Attorney, Agent, or Firm—Harness, Dickey & Pierce, PLC

[57] ABSTRACT

An over-running clutch pulley in which a pulley sheave and hub cooperate to define a composite inner cylindrical surface. A coil spring engages the composite cylindrical surface. The spring is oriented to transfer torque from the pulley sheave to the pulley hub when the pulley sheave is driving the pulley hub. The spring allows slip to occur between the pulley hub and sheave when the sheave is decelerated relative to the hub.

30 Claims, 3 Drawing Sheets

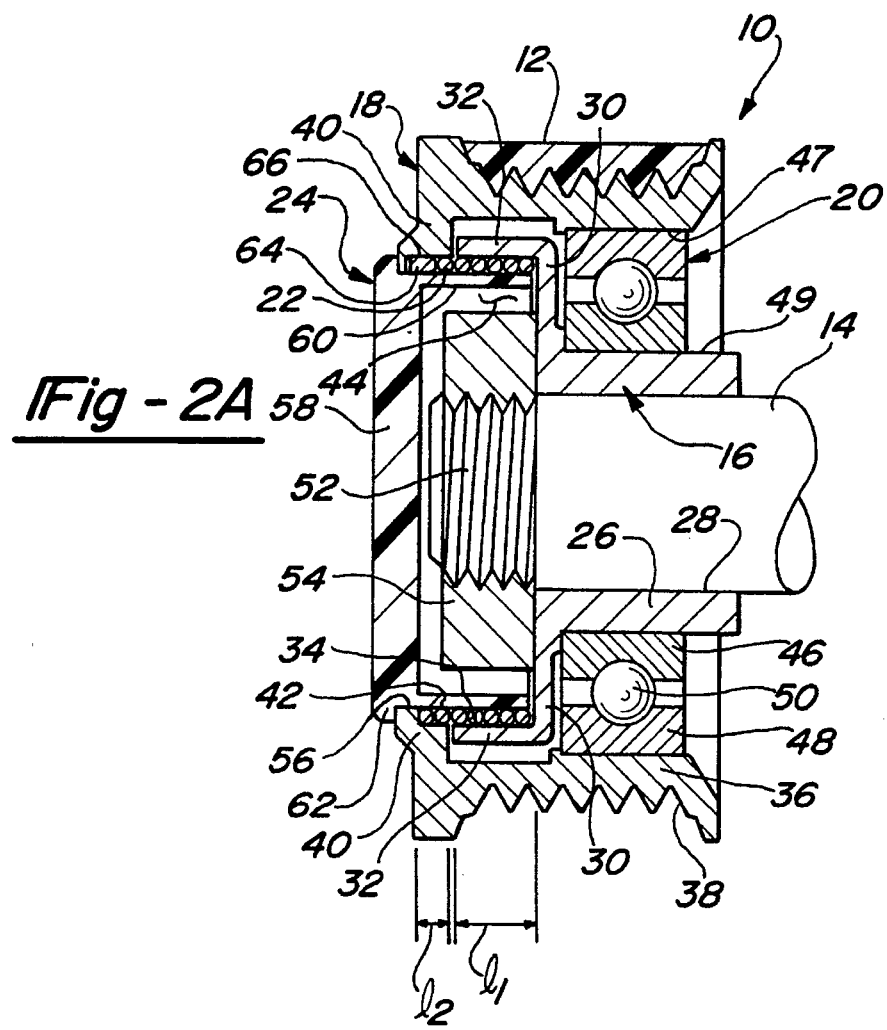

ONE-WAY OVER-RUNNING CLUTCH PULLEY

BACKGROUND OF THE INVENTION

1. Field of the Invention

This invention generally relates to pulleys. More particularly, the present invention relates to an overrunning clutch pulley which has particular application within an engine accessory system including an automotive alternator.

2. Description of the Prior Art

During operation of an engine, a belt drive system is sometimes used to power and operate the various accessory devices including, but not limited to, an alternator which provides electrical power to the vehicle. While several types of belt drive systems are in use, the system which is currently in favor is known as a serpentine drive system. Serpentine drive systems generally include a drive pulley connected to the crank shaft of the automobile's internal combustion (I.C.) engine and a ribbed belt trained about the drive pulley. The belt is also trained about one or more driven pulleys which are in turn connected to the input shafts of the various accessories. An automatic belt tensioner is also provided to maintain the tension of the belt within the proper range.

Most driven pulleys are provided in a one-piece design. These pulleys have no over-running capabilities, meaning that the pulley is rigidly mounted to rotate with the accessory input shaft. When the input shaft of the accessory device is running at high speed (up to 22,000 rpm for an alternator), a significant amount of inertia is built up within the accessory device. As a result of the combined inertia and the lack of over-running capabilities, relative slipping between the pulley and the belt can occur if the belt decelerates too quickly. If significant slipping of the belt occurs, an audible squeal will be produced. Not only is a squealing belt annoying from an auditory standpoint, but it also undesirable from a mechanical standpoint since it produces undue wear on the belt itself.

In a typical driving situation, the accessory belt will experience instances of large deceleration, such as during in a 1-2 upshift during wide open throttle acceleration. The situation is made even worse if the throttle is closed or "backed out" immediately after the transmission has been shifted. In these situations, the belt decelerates very quickly while the pulley, with the high inertia from the accessory, keeps rotating very quickly in spite of the friction between the pulley and the belt.

In attempting to cure the slipping of the belt and its associated problems, various design proposals have been put forward. One proposed design includes the use of higher belt tensions. However, in these designs the belt tends to wear even more quickly. Additionally, the bearings associated with the input shaft of the accessory also have shown greater wear and a shortened useful life. Various other tensioner constructions have been proposed, but those tensioners have generally exhibited poor performance and were costly to implement.

Attempts to cure the belt slippage and squeal problem have also proceeded in another direction. While early driven pulleys were constructed in a one-piece design, newer pulley designs have been proposed where the driven pulley itself exhibits an "over-running" capability. This allows the driven pulley to rotate in one direction relative to the input shaft of the accessory and therefore accommodate the inertia built up within the accessory.

U.S. Pat. No. 4,725,259 issued to Miyata discloses a construction where the driven pulley is mounted to the input shaft via a one-way clutch. The clutch only engages when the angular velocity of the pulley is increasing. Otherwise, the clutch slips relative to the input shaft of the accessory. This design is intended to smooth out the recurring fluctuations of instantaneous velocity in the belt that is typical of an I.C. engine. The design smooths out the corresponding recurrent instantaneous slipping of the belt relative to the driven pulley. No specific constructions for the Miyata one-way clutch are given in the disclosure of this patent.

U.S. Pat. No. 5,139,463 issued to Bytzek et al. discloses an alternator pulley construction in which a coil spring is disposed in a space between a hub attached directly to the accessory input shaft and a pulley mounted for relative movement exteriorly of the hub. The two ends of the coil spring are respectively bent radially inward and radially outward so that one will engage the hub and the other will engage the pulley. In this patent, the spring is wound so that when a positive torque is applied from the belt to the pulley, the rotational movement of the pulley will be transferred to the input shaft of the accessory as a result of the spring "winding-up" and the tangs engaging both the hub and pulley. Whenever negative torque is provided from the belt to the pulley, the spring enables the input shaft from the accessory and the hub to rotate relative to the pulley.

U.S. Pat. No. 5,156,573, also issued to Bytzek et al., discloses another clutch pulley construction where a coil spring is located in a space between a hub (attached to the accessory input shaft) and a pulley (mounted for relative movement exteriorly of the hub). Like the '463 patent, the coil spring in this patent also has one end bent radially outward. Additionally, the spring includes two sets of volutes, an intermediate set located between the other set and the bent end of the spring. The diameter of the hub and the inner diameter of the non-intermediate volutes are such that the volutes engage the hub when the pulley is being driven by the belt. When a negative torque is established between the alternator pulley and the input shaft, the volutes loosen with respect to the hub and allow slipping to occur. Importantly, the Bytzek design of the intermediate volutes allows for a "resilient rotational motion" to ease the shock loading between the pulley and the hub but can cause fatigue problems in the spring.

While the clutch pulleys of these patents may operate adequately in some respects, they have drawbacks in others. First, any lubricants associated with the spring are entrained away from the spring as a result of the centrifugal forces acting on the pulley during its operation. Additionally, these centrifugal forces also operate against the engagement of the spring on the hub. In other words, these centrifugal forces actually tend to force the spring out of engagement with the hub. Moreover, the bent ends or tabs of the springs further complicate the design and introduce stress concentrations into the spring which can lead to premature failure.

In view of the foregoing limitations and shortcomings of the prior art devices, as well as other disadvantages not specifically mentioned above, it should be apparent that there still exists a need for an improved one-way, over-running clutch pulley.

It is therefore a primary object of this invention to fulfill that need by providing a one-way over-running clutch pulley which overcomes the limitations and shortcomings of the prior art. Such a clutch pulley would find particular applicability with the accessory drive system of an automobile where it would allow for the relative slip between the pulley and the accessory input shaft.

It is also an object of the present invention to provide a one-way, over-running clutch pulley which accommodates large decelerations of the belt so as to reduce or eliminate the belt squeal and wear that normally occur as a result of the belt slipping relative to the pulley.

Another object of this invention is to provide an over-running clutch pulley which utilizes centrifugal forces in a positive manner during operation so as to enhance the transfer of torque to the accessory input shaft.

Still another object of this invention is to provide a one-way, over-running clutch pulley incorporating an internal coil spring to provide for the limited slip in the clutch pulley.

A related object of this invention is to provide a one-way, over-running clutch pulley which exhibits enhanced heat dissipating capabilities.

Yet another object of this invention is to provide a one-way, over-running clutch pulley having features which assist in maintaining functional operability of the pulley even in the event where the coil spring has failed or broken.

SUMMARY OF THE INVENTION

Briefly described, these and other objects of the invention are accomplished according to the present invention by providing a one-way, over-running clutch pulley that is intended for mounting to a rotational input shaft of a device, such as the alternator of an automobile. While the clutch pulley of the present invention is being specifically discussed in connection with automotive vehicles, it will be easily seen that the present invention has general applicability in a wide range of situations, particularly where it is desirable to eliminate slip between a rotational input member and an output member and where there is a need to prevent back driving of the system by the output member.

The clutch pulley of the present invention is engaged by a driving member or belt which is rotatably being driven. The clutch pulley has several main components including an inner pulley hub, an outer pulley sheave, a bearing and a coil spring.

The pulley hub includes a first portion through which a mounting bore is defined. The bore is sized and shaped to receive the input shaft of the driven device, such as an alternator in a vehicle accessory system. The input shaft of the driven device is mounted to the pulley hub so that relative rotational movement between the pulley hub and the input shaft is prevented. Accordingly, rotation of the pulley hub will cause rotation of the input shaft of the driven device and the accessory, e.g. the alternator. The pulley hub also includes a cylindrical axial extension off of the first portion. This extension defines a first inner cylindrical surface which is coaxial with the bore of the hub and the shaft of the accessory.

The pulley sheave has a first portion which is adapted to engage the driving member, the drive belt of the accessory system, which causes rotation of the pulley sheave. A second radial flange or portion of the pulley sheave extends off of the first portion and defines a second inner cylindrical surface. This second inner cylindrical surface has a diameter which is substantially the same as the diameter of the first inner cylindrical surface. Additionally, both cylindrical surfaces are coaxial with one another and adjacently located so that they cooperate to define a common or composite inner cylindrical surface which further defines a spring receiving cavity. This cavity allows for use of an axial retaining nut to hold the pulley to the input shaft of the driven device, the nut being located within the spring cavity and within the outside boundaries of the pulley.

The pulley sheave is mounted to the pulley hub by a bearing assembly which permits them to rotate relative to each other. As a result, the bearing assembly is located between concentric potions of the pulley sheave and hub.

Received in the cavity mentioned above is a coil spring. The free-standing outer diameter of the spring is slightly greater than the diameter defined by the composite inner cylindrical surface. In this manner, the spring is in an interference and frictional engagement with the composite inner cylindrical surface and retained by the radially outward contact normal force inherently exerted by the spring. The winding of the spring is oriented in a direction that compressively loads the spring, which would tend to unwind the spring and would effectively increase its diameter if it were not restrained by the composite inner cylindrical surface, whenever the pulley sheave is positively driven or accelerated relative to the pulley hub. Conversely, the diameter of the spring would effectively decrease if the pulley sheave is negatively driven or decelerated relative to the hub.

The effective increase in the diameter and compressive loading of the spring during positive driving and acceleration of the pulley sheave relative to the pulley hub causes the spring to exert an increased radially outward contact normal force on the composite inner cylindrical surface. The normal forces, which result in engagement of the spring and composite inner cylindrical surface, increase exponentially along the spring helix. Because the normal forces determine the frictional forces and therefore the torque load which can be carried by the present clutch pulley, the initial normal force caused by the interference fit between the spring and composite inner cylindrical surfaces can obviate the need for a tang on the spring, if a sufficient number of spring volutes engage both portions of the composite inner surface. With this increased normal force being applied to both the first and second inner cylindrical surfaces, these surfaces effectively become "locked" together by the spring and torque is transferred from the input member (belt) through the pulley sheave and hub to the shaft of the driven device.

When a deceleration or negative driving is experienced between the pulley sheave and the pulley hub, such as during a wide open throttle 1-2 upshift, the shaft of the driven device will not immediately respond to the deceleration because of the inertia built up within the driven device and the pulley hub will over-run the pulley sheave. This causes the spring to unload and "wind-up", effectively decreasing the diameter of the spring. Even a very slight reduction in the effective diameter of the spring results in a corresponding reduction in the normal force exerted by the spring on the two inner cylindrical surfaces which is sufficient to "unlock" the first and second inner cylindrical surfaces from each other and permitted relative rotation between the two surfaces. The pulley hub can therefore rotate under the inertia of the driven device via the shaft while the pulley sheave can rotate under the influence of the input member or belt.

Relative rotation in this manner reduces or eliminates relative slipping between the belt and the pulley and the associated squeal and premature wear problems.

A cap is fitted to the opening of the spring cavity. In addition to a radial face which covers the opening of the spring cavity, the cap includes an axial sleeve in close fit engagement with the inner diameter of the spring. As provided, the sleeve contains the lubricant in the immediate vicinity of the spring and, in combination with the radial face of the cap, prevents entry of dirt, water, salt and other contaminants.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 2a is a sectional view similar to that seen in FIG. 2 illustrating the present invention with an axial tang on one end of the spring;

FIG. 2b is an enlarged sectional view of a portion of a second embodiment of a clutch pulley according to the principles of the present invention.

DETAILED DESCRIPTION OF THE PREFERRED EMBODIMENT

Figure 1:
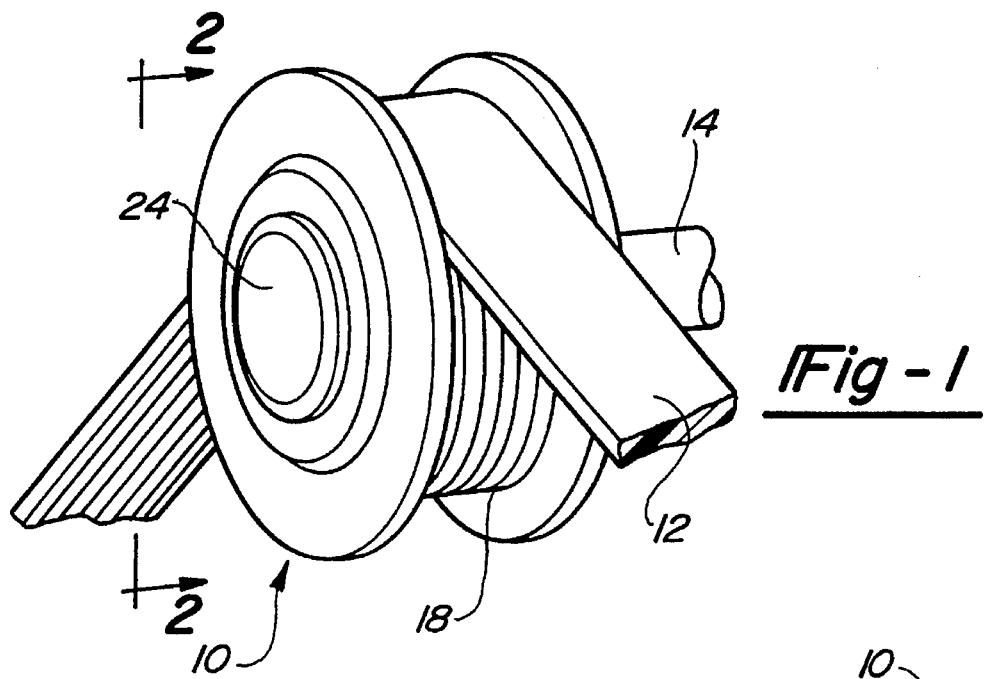
FIG. 1 is a perspective view of a one-way, over-running clutch pulley embodying the principles of the present invention.

Referring now in detail to the drawings, there is shown in FIG. 1 a one-way, over-running clutch pulley according to the principles of the present invention and generally designated at 10. The clutch pulley 10 has five principal components. These include a pulley hub 16, a pulley sheave 18, a bearing 20, a spring 22, and an end cap 24.

While shown in a generic application where a belt 12 provides a rotational input to the clutch pulley 10 and a shaft 14 delivers the rotational output from the clutch pulley 10, numerous specific applications can be envisioned where the clutch pulley 10 of the present invention would have applicability. For example, the belt 12 could be the ribbed serpentine belt of a motor vehicle accessory drive system and the shaft 14 could be the input shaft into an alternator used to provide power to the various electrical systems of the vehicle during its operation. It is in this particular application that the present invention will be described. However, it is not intended for the scope of the present invention specifically to be solely limited to motor vehicle applications. By way of illustration and not further limitation, an additional application in which the clutch pulley 10 of the present invention could be utilized includes wave power generation or any situation where a use of a one-way clutch is necessitated.

Figure 2:
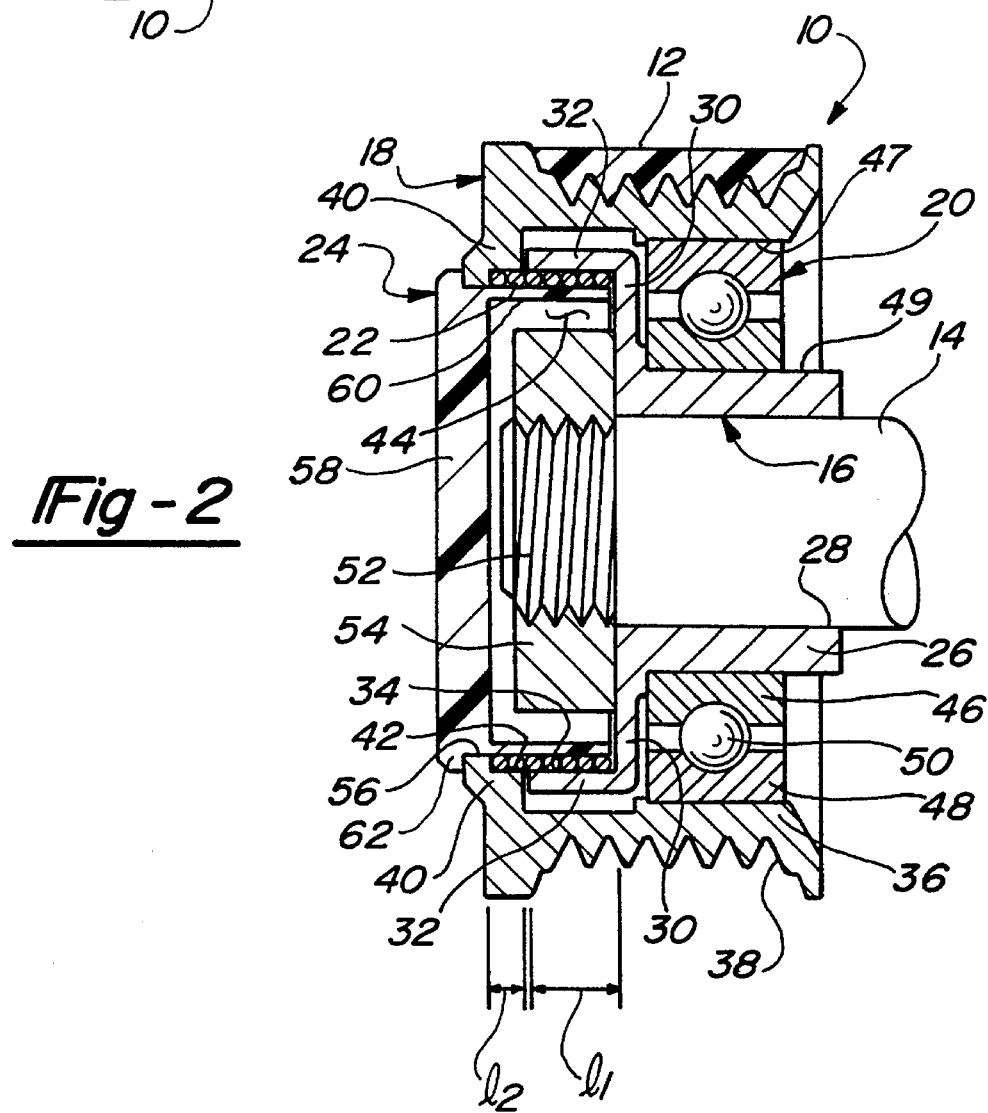
FIG. 2 is a sectional view taken substantially along line 2—2 in FIG. 1 illustrating in detail the construction of the clutch pulley of the present invention.

Referring now to FIG. 2, the pulley hub 16 includes a first cylindrical portion 26 through which a bore 28 is centrally defined. The diameter of the bore 28 approximates the outer diameter and shape of the shaft 14 and is intended to receive the shaft therein. The shaft 14 and the bore 28 can have various cross-sectional shapes and can even be round if otherwise provided with a mechanism to aid in preventing relative rotation between the pulley hub 16 and the shaft 14.

Formed on the outboard end of the first portion 26 is a radially extending flange 30. The flange 30 terminates in an axial extension 32 which is coaxial with the bore 28 and defines an inner cylindrical surface 34, the purpose of which will be more fully understood from the discussion which follows.

The pulley sheave 18 is located generally exteriorly about the pulley hub 16 and is rotatably supported thereon by the bearing 20. The bearing 20 is illustrated as a roller element bearing whose inner race is press-fit mounted onto an exterior surface or seat 49 of the first portion 26 of the pulley hub 16. The outer race 48 of the bearing 20 is similarly press-fit mounted to an inner surface or seat 47 on a first portion 36 of the pulley sheave 18. The roller element 50, which is illustrated as a ball bearing, is located between the inner and outer races 46 and 48. While not shown, the bearing 20 is permanently sealed so that additional lubrication over its useful life is not necessary. Obviously, other varieties of bearings 20, journal bearings for example, could be used in the present invention.

A grooved recess 38 is defined in the exterior of the first portion 36 of the pulley sheave 18 and is intended to receive the ribbed belt 12 therein. Extending radially inward from the outboard end of the first portion 36 is a radial flange 40 whose inner radial face defines an inner cylindrical surface 42. The inner cylindrical surface 42 is located to be adjacent to the inner cylindrical surface 34 of the pulley hub 16 and has a diameter which is substantially the same. In this manner, the inner cylindrical surfaces 34 and 42 cooperate to define a composite cylindrical surface. As used in this context, the term composite cylindrical surface is referring to both of the inner cylindrical surfaces 34 and 42 in conjunction with one another.

The spring 22 is located within the spring receiving cavity 44 and is a coil spring which, in its uncompressed or free standing condition, has a diameter which is slightly greater than the diameter of the composite cylindrical surface. When received in the cavity 44, the spring 22 frictionally engages with and exerts a radially outward normal force on both of the inner cylindrical surfaces 34 and 42.

To retain the clutch pulley 10 on the shaft 14, the outboard end of the shaft 14 is threaded 52. A retainer nut 54 engages with these threads 52 and clamps the clutch pulley 10 to the shaft 14. Inboard axial movement of the clutch pulley 10 is prevented by a shoulder (not shown) formed on the shaft 14 generally adjacent to the opposing end of the first portion 26 of the pulley hub 16.

The end cap 24 is mounted to a lip 56 formed on the end of the flange 40. The lip 56 not only defines the annular opening into the cavity 44, but also axially restrains outboard movement of the spring 22 because the diameter of the annular opening defined by the lip 56 is less than the diameter of the composite cylindrical surface. The end cap 24 includes two portions, a radial face or wall 58 and an axial sleeve 60. The wall 58 is oriented perpendicular to the axis about which the clutch pulley 10 rotates and includes a perimeter shoulder 62 which overlays the annular opening defined by the lip 56. On the opposite side of the wall 58, the sleeve 60 extends axially in a direction away of the shoulder 62. The exterior diameter of the sleeve 60 approximates the inner diameter of the spring 22 so that the sleeve 60 is in close fit relation or lightly contacts and is immediately adjacent to the innermost portions of the spring 22. Additionally, the sleeve 60 has a length which covers the spring 22 and terminates adjacent to the radial flange 30 of the pulley hub 16.

During operation, the clutch pulley 10 is driven by the belt 12 which may in turn be driven by the crankshaft pulley (not shown) of an I.C. engine (not shown). Rotation of the belt 12 therefore causes a corresponding rotation of the pulley sheave 18. If the pulley sheave 18 is accelerated relative to the pulley hub 16, the clutch pulley 10 of the present invention will transfer torque from the pulley sheave 18 to the pulley hub 16 and subsequently to the shaft 14 where it can be used to drive the armature (not shown) of an alternator (not shown). When the pulley sheave 18 is significantly decelerated relative to the rotational speed of the pulley hub 16, the clutch pulley 10 of the present invention allows for the pulley hub 16 to over-run or slip relative to the pulley sheave 18 as the inertia from the armature of the alternator prevents the pulley hub 16 from decelerating as fast as the pulley sheave 18. Previously, where no slip occurred in the pulley itself, the deceleration of the belt and the inertial over-running of the pulley caused the belt to squeal as it slipped relative to the pulley. Not only was this squeal annoying, but it has been seen that the slippage also created additional wear on the belt.

In the present invention, torque is transferred and slip is permitted because of the coil spring 22 and the specific clutch pulley 10 construction. To provide these complementary functions, the coil spring 22 is oriented in the cavity 44 so that it is "wound" in a direction which fosters the transferring torque and the providing of slip. The winding of the spring 22 is such that when the pulley sheave 18 is positively driving or accelerating relative to the pulley hub 16, the frictional engagement of the spring 22 with the inner cylindrical surface 42 of the pulley sheave 18 will cause the spring to experience compressive loading or unwinding. As the coil spring 22 is unwound, its freestanding outer diameter would effectively increase if it were not restrained by the inner cylindrical surfaces 34 and 42. The frictional forces between the inner cylindrical surfaces 34 and 42 and the coils or volutes of the spring 22 results in an increased compressive forces being built-up in the spring 22 along the helix of the spring thereby increasing the radially outward normal force being exerted on both the inner cylindrical surfaces 42 and 34 of the pulley sheave 18 and hub 16. As the normal force increases, the multiplicative effect of the spring 22 is to lock the pulley sheave 18 to the pulley hub 16 fostering the transfer of torque from the belt 12 to the shaft 14. Additionally, by having the spring 22 engage inner cylindrical surfaces of the pulley sheave 18 and hub 16, centrifugal forces induced by rotation of the clutch pulley 10 are utilized to further enhance and increase the radially outward normal force exerted by the spring 22. One additional benefit of this engagement between the exterior of the spring 24 and the interior cylindrical surfaces 34 and 42 is that any lubricants used with the spring 22 are retained on the spring 22 under the influences of the centrifugal forces and are not drawn away.

When the speed of the belt 12 is reduced, the inertia acting on the shaft 14 causes the pulley hub 16 to over-run the pulley sheave 18. The winding direction of the spring 22 causes the effective outer diameter of the spring 22 to slightly reduce as the spring 22 "winds-up". Corresponding with this reduction in the effective outer diameter of the spring 22, the frictional forces between the inner cylindrical surfaces 34 and 42 and the coils of the spring 22 result in a decrease of the compressive forces along the helix of the spring 22 which can produce a decrease in the radially outward normal force exerted by the spring 22 on the inner cylindrical surfaces 34 and 42. This in turn "unlocks" the inner cylindrical surfaces 34 and 42 from each other and the pulley sheave 16 is permitted to overrun and rotate relative to the pulley hub 18.

In the event the spring 22 utilized in the present clutch pulley 10 should fail and the coils separate into two or more pieces, the sleeve 60 of the end cap 24 operates as a retainer which will maintain the resulting pieces of the spring 22 in position relative to one another. This permits a clutch pulley 10 of the present invention having a failed spring 22 to continue to operate without a significant loss in performance.

A second embodiment of the present invention is generally shown in FIG. 2a. In this embodiment, one end of the spring 22 is provided with an axially extending tang 64. The tang 64 extends into a corresponding recess, hole or slot 66 defined in the lip 56 of the pulley sheave 18. Such a tang 64 is beneficial in those situations where only a few of the coils or volutes of the spring 22 are in engagement with one of the inner cylindrical surfaces (illustrated as the inner cylindrical surface 42 of the pulley sheave 18) of the composite inner cylindrical surface. Where a sufficient number of coils engage both inner cylindrical surfaces 34 and 42 of the composite inner cylindrical surface, a tang 64 is not necessary.

In a third embodiment of the present invention, seen in FIG. 2b, the clutch pulley 10 differs from the prior embodiments in two respects. First, each coil of spring 22 is provided with a non-circular or generally rectangular cross-sectional shape, as opposed to the circular cross-sectional shape seen in the first embodiment. The rectangular cross-sectional shape provides the spring 22 with an increased outer surface area and number of volutes for engagement with the inner cylindrical surfaces 34 and 42.

A second and independent distinction shown in the alternative embodiment is the relative lengths of the inner cylindrical surfaces 34 and 42. In the first embodiment, it can be seen that the inner cylindrical surface 34 of the pulley hub 16 has a length $l_1$ which is greater than the length $l_2$ of the inner cylindrical surface 42 of the pulley sheave 18. In the embodiment seen in FIG. 2b, the length $l_1'$ of the inner cylindrical surface 34 of the pulley hub 16 is less than the length $l_2'$ of the inner cylindrical surface 42 of the pulley sheave 18. By increasing the length $l_2'$ of the inner cylindrical surface 42 relative to the length $l_1'$ of the inner cylindrical surface 34, a greater axial length of the spring 22 is in contact with the pulley sheave 18 than in contact with the pulley hub 16. This has the added benefit of dissipating a greater amount of heat from the clutch pulley 10 through the pulley sheave 18, a result of the pulley sheave 18 having greater convective cooling capacities since it is directly exposed to ambient conditions.

A fourth possible construction, which is not illustrated, would provide the relative lengths $l_1$ and $l_2$ as being substantially the same as one another. While this would decrease the cooling effect provided by the pulley sheave 18 over the second embodiment, it would evenly distribute the normal force between the pulley sheave 18 and the pulley hub 16.

Figure 3:
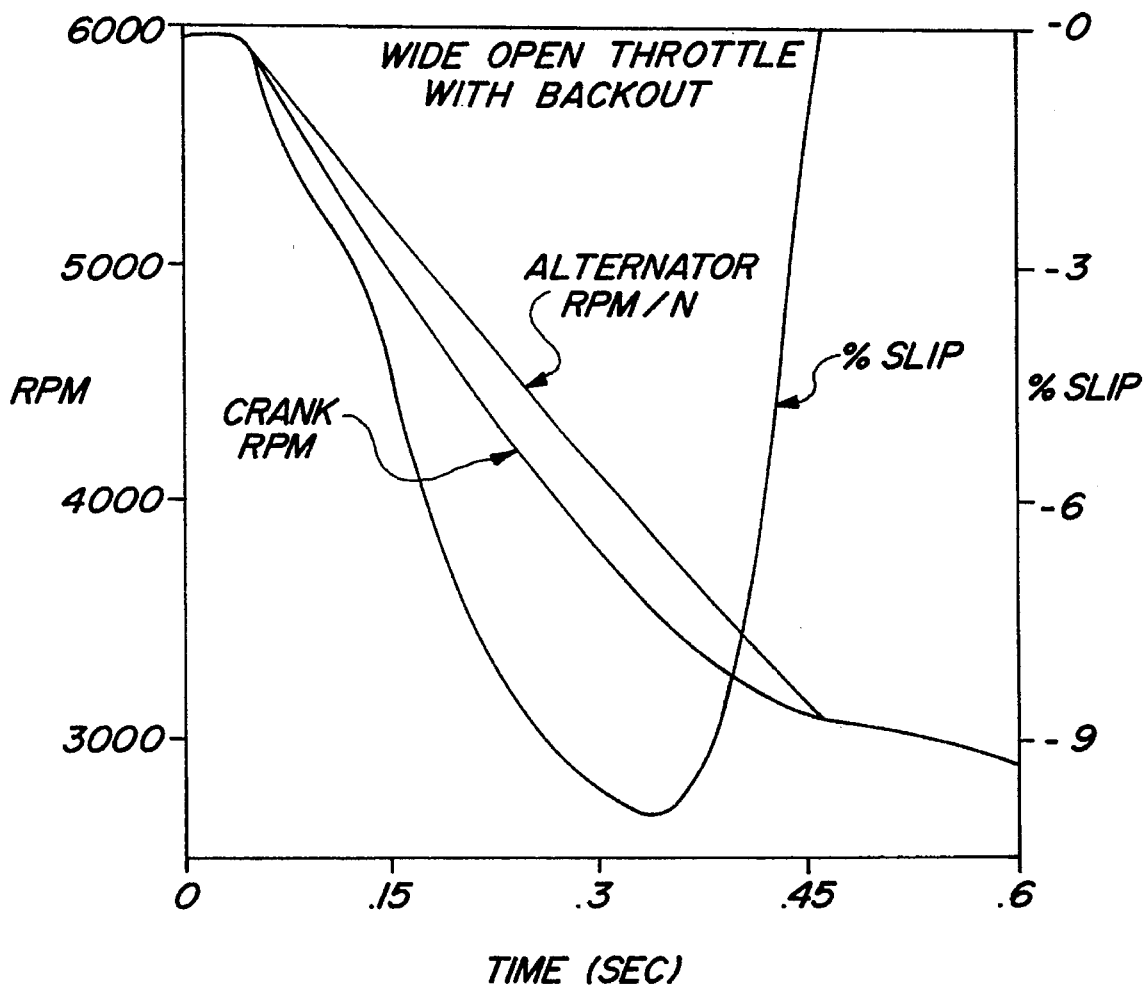
FIG. 3 is a graphical representation of the percent slip provided by the clutch pulley of the present invention between the input to the clutch pulley and the output from the clutch pulley during deceleration of the input relative to the output.

As seen in FIG. 3, the clutch pulley 10 of the present invention provides a significant amount of slip when the input to the clutch pulley 10 has been substantially decelerated relative to the output from the clutch pulley 10. In the figure, the input to the clutch pulley 10 is designated by the "crank rpm". The output from the clutch pulley is shown as the "alternator rpm/n", where n is the drive ratio of the belt and is approximately 3.0. As the input rpm decelerates relative to the output rpm, the percent slip increases as the pulley sheave 18 rotates relative to the pulley hub 16. Over time, the relative rotations of the pulley sheave 18 and hub 16 recorrelate and the percent slip provided by the clutch pulley 10 progresses back to zero.

In those situations where it is desirable for the pulley hub 16 to drive the pulley sheave 18, the present invention is easily employed. This can be achieved by reversing the winding or orientation of the spring. One of numerous possible applications of this final alternative would be where the clutch pulley 10 is used as the crankshaft pulley in driving the belt 12. In this regard, FIG. 2 can be interpreted as representing this alternative construction.

While the above description constitutes the preferred embodiment of the present invention, it will be appreciated that the invention is susceptible to modification, variation and change without departing from the proper scope and fair meaning of the accompanying claims.

We claim:

1. An over-running clutch pulley for attachment to an input member and for causing rotation of an output member, said clutch pulley comprising:

a first pulley portion including attachment means for attaching to the input member, said first pulley portion also including a cylindrical extension defining a first inner cylindrical surface of a first diameter;

a second pulley portion having attaching means for attaching to the output member and causing rotation of said output member, said second pulley portion including a portion defining a second inner cylindrical surface, said second inner cylindrical surface having a diameter substantially the same as said first diameter of said first inner cylindrical surface and being coaxial therewith, said first and second inner cylindrical surfaces being located adjacent to one another and cooperating to define a composite inner cylindrical surface of said first diameter;

single bearing means for permitting relative rotation of said first and second pulley portions; and a coil spring having a free standing outer diameter being greater than said first diameter of said composite inner cylindrical surface, said coil spring frictionally engaging said composite inner cylindrical surface and being retained in engagement therewith by a radially outward normal force inherently exerted by said spring, said spring being wound and oriented in a direction such that positive driving of said first pulley portion relative to said second pulley portion causes said spring to exert an increased outward normal force against said composite inner cylindrical surface whereby said first and second pulley portions are prevented from rotating relative to one another and torque is transferred from said first pulley portion to said second pulley portion, said spring also being oriented such that deceleration of said first pulley portion relative to said second pulley portion causes a decreased outward normal force to be exerted by said spring on said composite inner cylindrical surface whereby said first and second pulley portions are permitted to rotate relative to one another.

2. An over-running clutch pulley as set forth in claim 1 wherein said spring is formed from wire having a substantially circular cross-section.

3. An over-running clutch pulley as set forth in claim 1 wherein said spring is formed from wire having a substantially non-circular cross-section.

4. An over-running clutch pulley as set forth in claim 1 wherein said spring is formed from wire having a substantially rectangular cross-section.

5. An over-running clutch pulley as set forth in claim 1 wherein said first portion of said outer member includes a recess for receiving a belt therein.

6. An over-running clutch pulley as set forth in claim 1 wherein said second portion of said outer member extends radially inward from an axial end of said first portion.

7. An over-running clutch pulley as set forth in claim 1 wherein said spring is positioned to be forced radially outward into engagement with said inner composite cylindrical surface under centrifugal forces.

8. An over-running clutch pulley as set forth in claim 1 further comprising an end cap engaged with said pulley sheave, said end cap sealing over an annular opening defined by said second portion of said pulley sheave and sealing said spring therein.

9. An over-running clutch pulley as set forth in claim 8 wherein said end cap includes failure protection means for retaining said spring in an operative condition when said spring fails or breaks into multiple pieces.

10. An over-running clutch pulley as set forth in claim 9 wherein said failure protection means includes a sleeve in close fit engagement with inner surfaces of said spring.

11. An over-running clutch pulley as set forth in claim 10 wherein said sleeve is of a length substantially the same as an overall axial length of said spring.

12. An over-running clutch pulley as set forth in claim 11 wherein said sleeve is unitarily formed with said end cap.

13. An over-running clutch pulley as set forth in claim 1 wherein said spring has a substantially constant diameter in a free standing condition.

14. An over-running clutch pulley as set forth in claim 1 further comprising retention means for retaining lubricant materials in contact with said spring during operation of said clutch pulley.

15. An over-running clutch pulley as set forth in claim 14 wherein said retention means includes a sleeve in close fit engagement with inner surfaces of said spring.

16. An over-running clutch pulley as set forth in claim 15 wherein said sleeve has a length substantially the same as an overall axial length of said spring.

17. An over-running clutch pulley as set forth in claim 1 wherein said first inner cylindrical surface has an axial length greater than an axial length of said second inner cylindrical surface.

18. An over-running clutch pulley as set forth in claim 1 wherein said second inner cylindrical surface has an axial length greater than an axial length of said first inner cylindrical surface.

19. An over-running clutch pulley as set forth in claim 1 wherein said first inner cylindrical surface is in contact with a greater axial length of said spring than said second inner cylindrical surface.

20. An over-running clutch pulley as set forth in claim 1 wherein said second inner cylindrical surface is in contact with a greater axial length of said spring than said first inner cylindrical surface.

21. An over-running clutch pulley as set forth in claim 1 wherein said spring includes a tang on one end thereof, said tang engaging one of said pulley hub and said pulley sheave to prevent movement of said spring with respect thereto.

22. An over-running clutch pulley as set forth in claim 1 wherein said spring includes first and second ends formed without tangs engaging either of said pulley hub and said pulley sheave.

23. An over-running clutch pulley for attachment to an input member and for causing rotation of an output member, said clutch pulley comprising:

a first pulley portion including attachment means for attaching to said input member, said first pulley portion also including a cylindrical extension defining a first inner cylindrical surface of a first diameter;

a second pulley portion having attaching means for attaching to said output member and causing rotation of said output member, said second pulley portion including a portion defining a second inner cylindrical surface, said second inner cylindrical surface having a diameter substantially the same as said first diameter of said first inner cylindrical surface and being coaxial therewith, said first and second inner cylindrical surfaces being located adjacent to one another and cooperating to define a composite inner cylindrical surface of said first diameter;

bearing means for permitting relative rotation of said first and second pulley portions;

a coil spring having a free standing outer diameter being greater than said first diameter of said composite inner cylindrical surface, said coil spring frictionally engaging said composite inner cylindrical surface and being retained in engagement therewith by a radially outward normal force inherently exerted by said spring, said spring being wound and oriented in a direction such that positive driving of said first pulley portion relative to said second pulley portion causes said spring to exert an increased outward normal force against said composite inner cylindrical surface whereby said first and second pulley portions are prevented from rotating relative to one another and torque is transferred from said first pulley portion to said second pulley portion, said spring also being oriented such that deceleration of said first pulley portion relative to said second pulley portion causes a decreased outward normal force to be exerted by said spring on said composite inner cylindrical surface whereby said first and second pulley portions are permitted to rotate relative to one another; and an end cap engaged with said pulley sheave, said end cap sealing over an annular opening defined by said second portion of said pulley sheave and sealing said spring therein, said end cap including failure protection means for retaining said spring in an operative condition when said spring fails or breaks into multiple pieces.

24. An over-running clutch pulley for attachment to an input member and for causing rotation of an output member, said clutch pulley comprising:

a first pulley portion including attachment means for attaching to said input member, said first pulley portion also including a cylindrical extension defining a first inner cylindrical surface of a first diameter;

a second pulley portion having attaching means for attaching to said output member and causing rotation of said output member, said second pulley portion including a portion defining a second inner cylindrical surface, said second inner cylindrical surface having a diameter substantially the same as said first diameter of said first inner cylindrical surface and being coaxial therewith, said first and second inner cylindrical surfaces being located adjacent to one another and cooperating to define a composite inner cylindrical surface of said first diameter;

bearing means for permitting relative rotation of said first and second pulley portions; and a coil spring having a free standing outer diameter being greater than said first diameter of said composite inner cylindrical surface, said coil spring frictionally engaging said composite inner cylindrical surface and being retained in engagement therewith by a radially outward normal force inherently exerted by said spring, said spring being wound and oriented in a direction such that positive driving of said first pulley portion relative to said second pulley portion causes said spring to exert an increased outward normal force against said composite inner cylindrical surface whereby said first and second pulley portions are prevented from rotating relative to one another and torque is transferred from said first pulley portion to said second pulley portion, said spring also being oriented such that deceleration of said first pulley portion relative to said second pulley portion causes a decreased outward normal force to be exerted by said spring on said composite inner cylindrical surface whereby said first and second pulley portions are permitted to rotate relative to one another, said spring including first and second ends formed without tangs engaging either of said pulley hub and said pulley sheave.

25. An over-running clutch pulley as set forth in claim 1 wherein said spring is wound and oriented such that said first pulley portion is a pulley hub driving said second pulley portion which is a pulley sheave in rotation.

26. An over-running clutch pulley as set forth in claim 1 wherein said spring is wound and oriented such that said first pulley portion is a pulley sheave driving said second pulley portion which is a pulley hub in rotation.

27. An over-running clutch pulley as set forth in claim 1 wherein said bearing means is located between said first and second pulley portions and is axially offset in location relative to said coil spring.

28. An over-running clutch pulley as set forth in claim 27 wherein said bearing means is located in a position outside said diameter of said coil spring.

29. An over-running clutch pulley as set forth in claim 1 further comprising sealing means including permanent bearing means for sealing lubricant with said coil spring.

30. An over-running clutch pulley as set forth in claim 1 wherein said coil spring is lubricated and lubricant in said bearing means is isolated from lubricant with said coil spring.

* * * * *